United States Patent [19]
Nichols et al.

[11] Patent Number: 6,063,872
[45] Date of Patent: May 16, 2000

[54] MOLDING COMPOSITIONS CONTAINING SYNDIOTACTIC MONOVINYLIDENE AROMATIC POLYMER

[75] Inventors: Kevin L. Nichols; John M. Warakomski; David H. Bank, all of Midland, Mich.; Charles F. Diehl, Lake Jackson, Tex.

[73] Assignee: The Dow Chemical Company, Midland, Mich.

[21] Appl. No.: 09/146,176

[22] Filed: Sep. 3, 1998

Related U.S. Application Data

[60] Provisional application No. 60/060,299, Sep. 29, 1997.

[51] Int. Cl.⁷ .............................. C08L 25/04; C08L 25/06
[52] U.S. Cl. ......................... 525/241; 525/240; 525/98; 525/185; 524/515; 524/528; 524/370
[58] Field of Search ..................................... 525/240, 241, 525/98, 185; 524/515, 528, 370

[56] References Cited

U.S. PATENT DOCUMENTS

| | | | |
|---|---|---|---|
| 5,250,618 | 10/1993 | Fasulo et al. | 55/89 |
| 5,278,232 | 1/1994 | Seelert et al. | 525/71 |
| 5,334,657 | 8/1994 | Swartzmiller et al. | 525/71 |
| 5,344,869 | 9/1994 | Seelert et al. | 524/505 |
| 5,391,603 | 2/1995 | Wessel et al. | 524/396 |
| 5,391,611 | 2/1995 | Funayamo et al. | 524/508 |
| 5,395,890 | 3/1995 | Nakano et al. | 525/165 |
| 5,460,818 | 10/1995 | Park et al. | 426/415 |
| 5,532,315 | 7/1996 | Bonekamp et al. | 525/71 |
| 5,543,462 | 8/1996 | Okada et al. | 525/74 |
| 5,576,374 | 11/1996 | Betso et al. | 524/451 |
| 5,698,652 | 12/1997 | Aoyama et al. | 526/347 |
| 5,739,200 | 4/1998 | Cheung et al. | 524/504 |

FOREIGN PATENT DOCUMENTS

| | | |
|---|---|---|
| 0 767 211 | 4/1997 | European Pat. Off. . |
| 6116454A | 4/1994 | Japan . |
| 0748488A | 2/1995 | Japan . |
| 9527755 | 10/1995 | WIPO . |

OTHER PUBLICATIONS

Encyclopedia of Polymer Science and Engineering, 2nd Ed., vol. 8, edited by Mark et al., John Wiley & Sons, 1987.

USSN 60/071,318, filed Jan. 14, 1998, entitled "Thermoplastic Blends of Alpha–Olefin/Vinylidene Aromatic Monomer Interpolymers with Aromatic Polyethers".

Pellecchia, C. et al: "Alternating ethylene–stryrene copolymeriztion with a methylaluminoxane–free half–titanocene catalyst" Macromolecules, vol. 29, No. 4, pp. 1158–1162 1996.

*Primary Examiner*—Robert Dawson
*Assistant Examiner*—Kuo-Liang Peng

[57] ABSTRACT

A composition consisting essentially of:

A) a syndiotactic monovinylidene aromatic polymer, and

B) a random interpolymer of an aliphatic alpha-olefin and a vinyl aromatic monomer, wherein the random interpolymer contains greater than 40 weight percent vinyl aromatic monomer.

18 Claims, No Drawings

MOLDING COMPOSITIONS CONTAINING SYNDIOTACTIC MONOVINYLIDENE AROMATIC POLYMER

CROSS REFERENCE STATEMENT

This applications claims the benefit of U.S. Provisional Application No. 60/060,299, filed Sep. 29, 1997.

BACKGROUND OF THE INVENTION

The present invention relates to syndiotactic monovinylidene aromatic polymer compositions.

Blends of syndiotactic monovinylidene aromatic and olefin polymers are known in the art, combining the toughness and solvent resistance of an olefinic polymer with the high modulus and thermoformability of syndiotactic monovinylidene aromatic polymers. U.S. Pat. No. 5,460,818 issued to Park et al. discloses a composition comprising syndiotactic polystyrene (SPS), an aliphatic alpha-olefin homopolymer, a ethylene-styrene interpolymer compatibilizer and optional impact modifiers. However, this composition utilizes nonelastomeric polyolefins, therefore high elongation and toughness, i.e. ductility, are not achieved unless the polyolefin content is high.

U.S. Pat. No. 5,395,890 issued to Nakano et al. discloses a composition containing SPS, a polyolefin thermoplastic and a rubber polymer. However, the polyolefins are again nonelastomeric.

U.S. Pat. No. 5,391,603 issued to Wessel et al. discloses a composition comprising SPS, an olefin elastomer and a nucleator. However, the olefin elastomers are block or graft copolymers which are expensive components and add significant cost to such compositions or are not thermally stable at high processing temperatures needed for SPS polymers.

U.S. Pat. No. 5,391,611 issued to Funayama et al. discloses a composition comprising SPS and a rubbery polymer such as styrene-ethylene-butadiene-styrene (SEBS). Again, a block copolymer is used, increasing the composition cost and/or decreasing thermal stability.

Therefore, there remains a need for ductility modified syndiotactic monovinylidene aromatic polymer compositions containing elastomeric ductility modifiers that are cost effective.

SUMMARY OF THE INVENTION

One aspect of the present invention is a composition comprising:

A) a syndiotactic monovinylidene aromatic polymer, and

B) a random interpolymer of an aliphatic alpha-olefin and a vinyl aromatic monomer, wherein the interpolymer contains greater than 40 wt. percent vinyl aromatic monomer.

Surprisingly, according to the present invention, high temperature resistant syndiotactic monovinylidene aromatic polymer compositions can be produced having good elongation, rigidity and toughness at much lower cost due to the use of random polyolefin interpolymers as ductility modifiers instead of expensive block copolymers.

DETAILED DESCRIPTION OF THE INVENTION

In one embodiment, the present invention is a blend of a syndiotactic monovinylidene aromatic polymer and a random interpolymer of a vinyl aromatic and an aliphatic alpha-olefin monomer.

Component A) is a syndiotactic monovinylidene aromatic polymer. As used herein, the term "syndiotactic" refers to polymers having a stereoregular structure of greater than 90 percent syndiotactic, preferably greater than 95 percent syndiotactic, of a racemic triad as determined by $^{13}C$ nuclear magnetic resonance spectroscopy.

Monovinylidene aromatic polymers are homopolymers and copolymers of vinyl aromatic monomers, that is, monomers whose chemical structure possess both an unsaturated moiety and an aromatic moiety. The preferred vinyl aromatic monomers have the formula

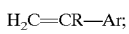

wherein R is hydrogen or an alkyl group having from 1 to 4 carbon atoms, and Ar is an aromatic radical of from 6 to 10 carbon atoms. Examples of such vinyl aromatic monomers are styrene, alpha-methylstyrene, ortho-methylstyrene, meta-methylstyrene, para-methylstyrene, vinyl toluene, para-t-butylstyrene, vinyl naphthalene, divinylbenzene and the like. Syndiotactic polystyrene is the currently preferred syndiotactic monovinylidene aromatic polymer. Typical polymerization processes for producing syndiotactic monovinylidene aromatic polymers are well known in the art and are described in U.S. Pat. Nos. 4,680,353, 5,066,741, 5,206,197 and 5,294,685, which are incorporated herein by reference.

The Mw of the syndiotactic monovinylidene aromatic polymer used in the composition of the present invention is not critical, but is typically from 100,000 to 450,000.

Component B) can be any substantially random interpolymer of a vinyl aromatic and an aliphatic alpha-olefin monomer, wherein the interpolymer contains at least 40 wt. percent vinyl aromatic monomer. The term "interpolymer" as used herein refers to polymers prepared by the polymerization of at least two different monomers. The generic term interpolymer thus embraces copolymers, usually employed to refer to polymers prepared from two different monomers, and polymers prepared from more than two different monomers.

While describing in the present invention a polymer or interpolymer as comprising or containing certain monomers, it is meant that such polymer or interpolymer comprises or contains polymerized therein, units derived from such a monomer. For example, if the monomer is ethylene $CH_2=CH_2$, the derivative of this unit as incorporated in the polymer is $—CH_2—CH_2—$.

The vinyl aromatic monomers contained in the interpolymers of Component B) include those vinyl aromatic monomers described previously as monomers useful for preparing the syndiotactic monovinylidene aromatic polymers of Component A).

The aliphatic alpha-olefin monomers contained in the interpolymers of Component B) include aliphatic and cycloaliphatic alpha-olefins having from 2 to 18 carbon atoms, and preferably alpha-olefins having from 2 to 8 carbon atoms. Most preferably, the aliphatic alpha-olefin comprises ethylene or propylene, preferably ethylene, optionally together with one or more other alpha-olefins having from 3 to 8 carbon atoms, such as for example ethylene and propylene, or ethylene and octene, or ethylene and propylene and octene.

The interpolymers suitable as Component B) are preferably a pseudo-random linear or substantially linear, more preferably a linear interpolymer comprising an aliphatic alpha-olefin and a vinyl aromatic monomer. These pseudo-random linear interpolymers are described in U.S. Ser. No. 07/545,403 filed Jul. 3, 1990 (corresponding to EP-A-0,416, 815) which is incorporated herein by reference.

A particular distinguishing feature of pseudo-random interpolymers is the fact that all phenyl or substituted phenyl groups substituted on the polymer backbone are separated by two or more methylene units. In other words, the pseudo-random interpolymers comprising an a-olefin and vinyl aromatic monomer can be described by the following general formula (using styrene as the hindered monomer and ethylene as the olefin for illustration):

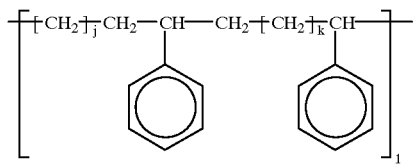

where j, k and l≧1

The symbol ≧ means equal to or greater than

It is believed that during the addition polymerization reaction of ethylene and styrene employing a catalyst as described hereinafter, if a hindered monomer (styrene) is inserted into the growing polymer chain, the next monomer inserted must be ethylene or a hindered monomer which is inserted in an inverted fashion. Ethylene, on the other hand, may be inserted at any time. After an inverted hindered monomer insertion, the next monomer must be ethylene, as the insertion of another hindered monomer at this point would place the hindering substituent too close to the previously inserted hindered monomer.

Most preferably, Component B) is a pseudo-random linear interpolymer comprising ethylene and styrene.

The content of units derived from the vinyl aromatic monomer incorporated in Component B), and preferably in the pseudo-random, linear interpolymer, preferably is greater than 40 wt. percent, more preferably at least 50 wt. percent, and most preferably at least 60 wt. percent based on the total weight of the interpolymer.

Preferably, the interpolymer of Component B) has a weight average molecular weight (Mw) of greater than 13,000. Also preferably such polymers possess a melt index (I2), ASTM D-1238 Procedure A, condition E, of less than 125, more preferably from 0.01–100, even more preferably from 0.01 to 25, and most preferably from 0.05 to 6.

While preparing the substantially random interpolymer of Component B), as will be described hereinafter, an amount of atactic monovinylidene aromatic homopolymer may be formed due to homopolymerization of the vinyl aromatic monomer at elevated temperatures. In general, the higher the polymerization temperature, the higher the amount of homopolymer formed. The presence of monovinylidene aromatic homopolymer is in general, not detrimental for the purposes of the present invention and may be tolerated. The monovinylidene aromatic homopolymer may be separated from Component B), if desired, such as by extraction with a suitable extracting agent, acetone or chloroform. For the purpose of the present invention it is preferred that Component B) contain no more than 20 percent by weight, based on the weight of Component B), more preferably less than 15 weight percent of monovinylidene aromatic homopolymer.

The substantially random interpolymers may be modified by typical grafting, hydrogenation, functionalizing, or other reactions well known to those skilled in the art, provided their impact or ductility modification function will not be substantially affected. The polymers may be readily sulfonated or chlorinated to provide functionalized derivatives according to established techniques. The interpolymers may also be oil extended or combined with other lubricants.

The pseudo-random interpolymers can be prepared as described in U.S. Ser. No. 07/545,403 filed Jul. 3, 1990 (corresponding to EP-A-0,416,815). Preferred operating conditions for such polymerization reactions are pressures from atmospheric up to 3000 atmospheres and temperatures from 30° C. to 200° C.

Examples of suitable catalysts and methods for preparing the pseudo-random interpolymers are disclosed in U.S. application Ser. No. 07/545,403, filed Jul. 3, 1990 (EP-A-416,815); U.S. application Ser. No. 07/547,718, filed Jul. 3, 1990 (EP-A-468,651), now abandoned; U.S. application Ser. No. 07/702,475, filed May 20, 1991 (EP-A-514,828), now abandoned; U.S. application Ser. No. 07/876,268, filed May 1, 1992, (EP-A-520,732), now U.S. Pat. No. 5,721,185, U.S. application Ser. No. 07/884,966, filed May 15, 1992 (corresponding to WO 93/23412), now U.S. Pat. No. 5,350,723, U.S. application Ser. No. 08/34,434, filed Mar. 19, 1993, now U.S. Pat. No. 5,347,024, U.S. application Ser. No. 08/82,197, filed Jun. 24, 1993, now abandoned, as well as U.S. Pat. Nos.: 5,055,438, 5,057,475, 5,096,867, 5,064,802, 5,132,380, and 5,189,192, all of which are incorporated herein by reference.

The composition of the present invention typically comprises from 65, generally from 68, preferably from 70, more preferably from 72, and most preferably from 75 to 99, generally to 95, preferably to 90, more preferably to 88, and most preferably to 85 wt. percent of the syndiotactic monovinylidene aromatic polymer. Additionally, the composition comprises from 1, generally from 5, preferably from 10, more preferably from 12, and most preferably from 15 to 35, generally to 32, preferably to 30, more preferably to 28, and most preferably to 25 wt. percent of the vinyl aromatic/aliphatic alpha-olefin interpolymer.

Optionally, the composition of the present invention can also contain other modifiers in addition to the vinyl aromatic/aliphatic alpha-olefin interpolymer. In another aspect of the present invention the composition further comprises an olefinic impact modifier, Component C), in amounts of from 0 to 35 wt. percent based on the total weight of the composition. Such olefinic impact modifiers can be any elastomeric polyolefin such as those described in U.S. Pat. No. 5,460,818, which is incorporated herein by reference. Elastomeric polyolefins include any polymer comprising one or more $C_{2-20}$ α-olefins in polymerized form, having Tg less than 25° C., preferably less than 0° C. Examples of the types of polymers from which the present elastomeric polyolefins are selected include homopolymers and copolymers of α-olefins, such as ethylene/propylene, ethylene/1-butene, ethylene/1-hexene or ethylene/1-octene copolymers, and terpolymers of ethylene, propylene and a comonomer such as hexadiene or ethylidenenorbornene. Grafted derivatives of the foregoing rubbery polymers such as polystyrene-, maleic anhydride-, polymethylmethacrylate- or styrene/methyl methacrylate copolymer-grafted elastomeric polyolefins may also be used.

Preferred elastomeric polyolefins of Component C) are such polymers that are characterized by a narrow molecular weight distribution and a uniform branching distribution. Preferred elastomeric polyolefins are linear or substantially linear ethylene interpolymers having a density from 0.85 to 0.89 g/cm³ and a melt index from 0.5 to 20 g/10 min. Such polymers are preferably those prepared using a Group 4 metal constrained geometry complex by means of a continuous solution polymerization process, such as are disclosed in U.S. Pat. Nos. 5,272,236 and 5,278,272, the teachings of which are hereby incorporated by reference. Generally, the elastomeric polyolefins of Component C) have a density of from 0.860 to 0.895 g/cm³, preferably less than 0.895, more preferably less than 0.885 and most preferably less than 0.88 g/cm³.

Where melt index values are specified in the present application without giving measurement conditions, the melt index as defined in ASTM D-1238, Condition 190° C./2.16 kg (formerly known as "Condition (E)" and also known as 12) is meant.

The term "substantially linear" ethylene polymer or interpolymer as used herein in describing Component C) means that, in addition to the short chain branches attributable to intentionally added α-olefin comonomer incorporation in interpolymers, the polymer backbone is substituted with an average of 0.01 to 3 long chain branches/1000 carbons, more preferably from 0.01 long chain branches/1000 carbons to 1 long chain branches/1000 carbons, and especially from 0.05 long chain branches/1000 carbons to 1 long chain branches/1000 carbons. In contrast to the term "substantially linear", the term "linear" means that the polymer lacks measurable or demonstrable long chain branches, i.e., the polymer is substituted with an average of less than 0.01 long branches/1000 carbons.

Long chain branching is defined herein as a chain length of at least 1 carbon less than the number of carbons in the longest intentionally added α-olefin comonomer, whereas short chain branching is defined herein as a chain length of the same number of carbons in the branch formed from any intentionally added α-olefin comonomer after it is incorporated into the polymer molecule backbone. For example, an ethylene/1-octene substantially linear polymer has backbones substituted with long chain branches of at least 7 carbons in length, but it also has short chain branches of only 6 carbons in length resulting from polymerization of 1-octene.

The presence and extent of long chain branching in ethylene interpolymers is determined by gel permeation chromatography coupled with a low angle laser light scattering detector (GPC-LALLS) or by gel permeation chromatography coupled with a differential viscometer detector (GPC-DV). The use of these techniques for long chain branch detection and the underlying theories have been well documented in the literature, for example in Zimm, G. H. and Stockmayer, W. H., *J. Chem. Phys.*, Vol. 17, p. 1301 (1949) and Rudin, A., *Modern Methods of Polymer Characterization*, John Wiley & Sons, New York (1991), pp.103–112.

A. Willem deGroot and P. Steve Chum, both of The Dow Chemical Company, at the Oct. 4, 1994 conference of the Federation of Analytical Chemistry and Spectroscopy Society (FACSS) in St. Louis, Mo., U.S.A., presented data demonstrating that GPC-DV is a useful technique for quantifying the presence of long chain branches in substantially linear ethylene interpolymers. In particular, deGroot and Chum found that the level of long chain branches in substantially linear ethylene homopolymer samples measured using the Zimm-Stockmayer equation correlated well with the level of long chain branches measured using $^{13}$C NMR.

Further, deGroot and Chum found that the presence of octene does not change the hydrodynamic volume of the polyethylene samples in solution and, as such, one can account for the molecular weight increase attributable to octene short chain branches by knowing the mole percent octene in the sample. By deconvoluting the contribution to molecular weight increase attributable to 1-octene short chain branches, deGroot and Chum showed that GPC-DV may be used to quantify the level of long chain branches in substantially linear ethylene/1-octene copolymers.

deGroot and Chum also showed that a plot of Log(I2, Melt Index) as a function of Log (GPC, Weight Average Molecular Weight) as determined by GPC-DV illustrates that the long chain branching aspects (but not the branching extent) of substantially linear ethylene polymers are comparable to that of high pressure, highly branched low density polyethylene (LDPE) and are clearly distinct from ethylene polymers produced using Ziegler-type catalysts such as hafnium and vanadium complexes.

The empirical effect of the presence of long chain branching in the substantially linear ethylene/α-olefin interpolymers used in the invention is manifested as enhanced rheological properties which are quantified and expressed herein in terms of gas extrusion rheometry (GER) results, and/or in terms of melt flow ratio (I10/I2) increase.

Substantially linear ethylene interpolymers as used herein are further characterized as having (i) a melt flow ratio, I10/I2≧5.63, (ii) a molecular weight distribution or polydispersity, Mw/Mn, as determined by gel permeation chromatography and defined by the equation: (Mw/Mn)=(I10/I2)−4.63, (iii) a critical shear stress at the onset of gross melt fracture, as determined by gas extrusion rheometry, of greater than 4×10⁶ dynes/cm³, or a gas extrusion rheology such that the critical shear rate at onset of surface melt fracture for the substantially linear ethylene polymer is at least 50 percent greater than the critical shear rate at the onset of surface melt fracture for a linear ethylene polymer, wherein the substantially linear ethylene polymer and the linear ethylene polymer comprise the same comonomer or comonomers, the linear ethylene polymer has an I2, Mw/Mn and density within 10 percent of the substantially linear ethylene polymer and wherein the respective critical shear rates of the substantially linear ethylene polymer and the linear ethylene polymer are measured at the same melt temperature using a gas extrusion rheometer, and (iv) a single differential scanning calorimetry, DSC, melting peak between −30° C. and 150° C.

Determination of the critical shear rate and the critical shear stress in regards to melt fracture as well as other rheology properties such as the "rheological processing index" (PI) is performed using a gas extrusion rheometer (GER). The gas extrusion rheometer is described by M. Shida, R. N. Shroff and L. V. Cancio in *Polymer Engineering Science*, Vol.17, No.11, p. 770 (1977), and in *Rheometers for Molten Plastics*, by John Dealy, published by Van Nostrand Reinhold Co. (1982) on pp. 97–99. The processing index is measured at a temperature of 190° C., at nitrogen pressure of 2500 psig (17 Mpa) using a 0.0296 inch (0.0117 cm) diameter, 20:1 L/D die with an entrance angle of 180°. The GER processing index is calculated in millipoise units from the following equation:

$$PI=2.15\times10^6 \text{ dynes/cm}^2/(1000\times\text{shear rate}),$$

where: 2.15×10⁶ dynes/cm² is the shear stress at 2500 psi, (17 Mpa) and the shear rate is the shear rate at the wall represented by the following equation: 32Q'/(60 sec/min) (0.745)(diameter×2.54 cm/in)³, where Q' is the extrusion rate (g/min), 0.745 is the melt density of the polyethylene (g/cm³), and diameter is the orifice diameter of the capillary (inches).

The PI is the apparent viscosity of a material measured at apparent shear stress of 2.15×10⁶ dyne/cm².

For the substantially linear ethylene polymers described herein, the PI is less than or equal to 70 percent of that of a comparative linear olefin polymer having an I2 and Mw/Mn each within 10 percent of the substantially linear ethylene polymers.

The rheological behavior of substantially linear ethylene polymers can also be characterized by the Dow Rheology Index (DRI), which expresses a polymer's "normalized relaxation time as the result of long chain branching." (See, S. Lai and G. W. Knight "ANTEC '93 Proceedings, INSITE™ Technology Polyolefins (ITP)—New Rules in the Structure/Rheology Relationship of Ethylene/α-Olefin Copolymers," New Orleans, La., U.S.A., May 1993.) DRI values range from 0, for polymers which do not have any measurable long chain branching (for example, TAFMER™ products available from Mitsui Petrochemical Industries and EXACT™ products available from Exxon Chemical Company), to 15 and is independent of melt index. In general, for low- to medium-pressure ethylene polymers (particularly at lower densities), DRI provides improved correlations to melt elasticity and high shear flowability relative to correlations of the same attempted with melt flow ratios. For the substantially linear ethylene polymers useful in this invention, DRI is preferably at least 0.1, and especially at least 0.5, and most especially at least 0.8. DRI can be calculated from the equation:

$$DRI = 3652879 \times \tau_0^{1.00649}/(\eta_0-1)/10$$

where $\tau_0$ is the characteristic relaxation time of the material and $\eta_0$ is the zero shear viscosity of the material. Both $\tau_0$ and are the "best fit" values to the Cross equation, that is, $$\eta/\eta_0 = 1/(1+(\gamma \cdot \tau_0)^n)$$

where n is the power law index of the material, and $\eta$ and $\gamma$ are the measured viscosity and shear rate (rad sec$^{-1}$), respectively. Baseline determination of viscosity and shear rate data are obtained using a Rheometric Mechanical Spectrometer (RMS-800) under dynamic sweep mode from 0.1 to 100 rad/sec at 190° C. and a Gas Extrusion Rheometer (GER) at extrusion pressures from 1000 psi to 5000 psi (6.89 to 34.5 MPa), which corresponds to shear stress from 0.086 to 0.43 MPa, using a 0.0754 mm diameter, 20:1 L/D die at 190° C. Specific material determinations can be performed from 140° C. to 190° C. as required to accommodate melt index variations.

An apparent shear stress versus apparent shear rate plot is used to identify the melt fracture phenomena. According to Ramamurthy in *Journal of Rheology, Vol.* 30(2), pp. 337–357, 1986, above a certain critical flow rate, the observed extrudate irregularities may be broadly classified into two main types: surface melt fracture and gross melt fracture. Surface melt fracture occurs under apparently steady flow conditions and ranges in detail from loss of specular gloss to the more severe form of "sharkskin." In this disclosure, the onset of surface melt fracture (OSMF) is characterized as the beginning of losing extrudate gloss at which the surface roughness of extrudate can only be detected by 40x magnification. The critical shear rate at onset of surface melt fracture for the substantially linear ethylene polymers is at least 50 percent greater than the critical shear rate at the onset of surface melt fracture of a linear ethylene polymer having about the same I2 and Mw/Mn.

Gross melt fracture occurs at unsteady flow conditions and ranges in detail from regular (alternating rough and smooth or helical) to random distortions. The critical shear rate at onset of surface melt fracture (OSMF) and onset of gross melt fracture (OGMF) will be used herein based on the changes of surface roughness and configurations of the extrudates extruded by a GER.

Substantially linear ethylene polymers useful as Component C) in the composition of the present invention are also characterized by a single DSC melting peak. The single melting peak is determined using a differential scanning calorimeter standardized with indium and deionized water. The method involves 5 to 7 mg sample sizes, a "first heat" to 150° C. which is held for 4 minutes, a cool down at 10° C./minute to −30° C. which is held for 3 minutes, and heated at 10° C./minute to 150° C. for the "second heat." The single melting peak is taken from the "second heat" heat flow versus temperature curve. Total heat of fusion of the polymer is calculated from the area under the curve.

The term "polydispersity" as used herein is a synonym for the term "molecular weight distribution" which is determined as follows: The polymer or composition samples are analyzed by gel permeation chromatography (GPC) on a Waters 150° C. high temperature chromatographic unit equipped with three mixed porosity columns (Polymer Laboratories 103, 104, 105, and 106), operating at a system temperature of 140° C. The solvent is 1,2,4-trichlorobenzene, from which 0.3 percent by weight solutions of the samples are prepared for injection. The flow rate is 1.0 milliliters/minute and the injection size is 200 microliters.

The molecular weight determination is deduced by using narrow molecular weight distribution polystyrene standards (from Polymer Laboratories) in conjunction with their elution volumes. The equivalent polymer molecular weights are determined by using appropriate Mark-Houwink coefficients for polyethylene and polystyrene (as described by Williams and Word in *Journal of Polymer Science, Polymer Letters,* Vol. 6, p. 621 (1968), to derive the following equation:

$$M_{polyethylene} = 0.4316(M_{polystyrene}).$$

Weight average molecular weight, Mw, is calculated in the usual manner according to the following formula:

$$M_w = \Sigma i \; w_i \cdot M_i,$$

where wi and Mi are the weight fraction and molecular weight, respectively, of the ith fraction eluting from the GPC column.

Additionally the elastomeric polyolefins of Component C) can be extended by incorporation of an aliphatic oil. The extending oils, also referred to as paraffinic/naphthenic oils, are typically fractions of refined petroleum products having less than about 30 percent by weight of aromatics (by clay-gel analysis) and having viscosities between about 100 and 500 SSU at 1 00° F. (38° C.). Commercial extending oils include SHELLFLEX® oils, numbers 310, 371 and 311 (which is a blend of 310 and 371), available from Shell Oil Company or Drakeol™, numbers 34 or 35, available from Penreco division of Pennzoil Products Company. The amount of extending oil employed varies from 0.01 to 35.0 percent by weight of the elastomeric polyolefin, preferably from 0.1–25 percent.

The polyolefin of Component C) may also comprise one or more domain forming rubbery polymers C$_2$). Such additional rubbery polymers are suitably chosen in order to impart additional impact absorbing properties to the polymer composition. Generally, it is desirable to provide a domain forming rubbery polymer having extremely high melt viscosity, that is, very low melt flow. Such polymers having high melt viscosity are not drawn into extremely thin sections by the shear forces of the compounding process, and retain greater ability to reform discrete rubber particles more closely resembling spherical particles upon discontinuance of shearing forces. Additionally, the domain forming rubbery polymer beneficially should retain sufficient elastic memory to reform droplets in the melt when shearing forces are absent. The domain forming rubbery polymer is selected to be compatible with the elastomeric polyolefin of C) into which it mostly partitions under processing conditions, and therefore, the shearing forces are not as detrimental to the rubber domain. Most preferred domain forming rubbery polymers are those having a melt flow rate, Condition X (315° C., 5.0 Kg) from 0 to 0.5 g/10 min. Representative polymers include block copolymers of styrene and olefin such as styrene-butadiene-styrene (SBS) triblock copolymer and styrene-butadiene diblock copolymer; block copolymers of styrene and isoprene, such as styrene-isoprene diblock copolymers and hydrogenated versions thereof. Preferably, the block copolymers contain from 15 to 45 weight percent styrene. Most preferably, the block copolymer is a hydrogenated SBS block copolymer. Additionally, an interpolymer similar to those of component B) but containing up to 40 wt. % styrene, or another polyolefin as described above can act as the domain forming rubbery polymer.

Generally, higher molecular weight domain forming rubbery block copolymers possess increased melt viscosity. Accordingly, preferred domain forming rubbery block copolymers are those having Mw from 100,000 to 400,000 Daltons, more preferable from 150,000 to 300,000 Daltons, and having Tg less than 25° C., more preferably less than 0° C. Weight average molecular weights recited herein are apparent values based on a polystyrene standard, derived from gel permeation chromatography data, and not corrected for hydrodynamic volume differences between polystyrene and other polymeric Components. Preferred quantities of the domain forming rubbery polymer is from 2 to 40, most preferably 5 to 25 parts by weight per 100 parts of the polyolefin phase of C).

In addition to the domain forming rubbery polymer, a compatibilizing rubbery polymer may also be used in combination with the polyolefin of Component C). The desirable characteristic of the compatibilizing rubbery polymer is to provide compatibility between the syndiotactic monovinylidene aromatic polymer, component A), and the elastic polyolefin, component C, so as to minimize interfacial tension between the molten phases and to develop satisfactory adhesion between the solid phases to promote impact adsorption. Decreased interfacial tension in the melt promotes smaller rubber droplet formation due to the driving force to reduce surface area of the rubber particles in contact with the matrix. Representative compatibilizing polymers include multi-block copolymers of styrene and olefin such as styrene-butadiene-styrene (SBS) triblock copolymer and styrene-butadiene diblock copolymer; block copolymers of styrene and isoprene, such as styrene-isoprene diblock copolymers and hydrogenated versions thereof, and copolymers with greater numbers of blocks such as styreneethylene-propylene-styrene copolymers. Preferably, the multi-block copolymers contain from 45 to 80 wt. percent styrene. Most preferably, the block copolymer is a SEPS block copolymer. It is also possible for elastomeric interpolymer B) to act as the compatibilizing rubbery polymer.

The operating conditions for combining Components A), B) and C) are preferably chosen such that the aforementioned rubber particle formation occurs. If the molten polymer, containing undesirable thin strata of the olefinic impact modifier due to shearing forces, is quenched relatively quickly from the melt, the necessary droplet formation cannot occur and the resulting molded part will be deficient in impact properties. This result can occur, for example, in a molding process using molds operating at too low a mold temperature.

Other components can also be used to enhance the ductility properties of the composition of the present invention. In another embodiment of the present invention the composition also comprises from 0 to 35 wt. percent of an alpha-olefin/vinyl aromatic interpolymer, Component D), wherein the interpolymer contains from 25 to 40 wt. percent vinyl aromatic monomer. The vinyl aromatic monomers and alpha-olefins are as defined in Component B), however the vinyl aromatic content is preferably less than or equal to 40, more preferably less than or equal to 35 and most preferably less than or equal to 30 wt. percent of the interpolymer.

The composition of the present invention can also comprise from 0 to 10 wt. % of a lubricant, Component E), based on the total weight of the composition. Exemplary lubricants include stearic acid, behenic acid, zinc stearate, calcium stearate, magnesium stearate, ethylene bis-stearamide, pentaerythritol tetrastearate, organo phosphate, mineral oil, trimellitate, polyethylene glycol, silicone oil, epoxidized soy bean oil, tricresyl phosphate, polyethylene glycol dimethyl ether, dioctyl adipate, di-n-butyl phthalate, palmityl palmitate, butylene glycol montanate (Wax OP available from Hoechst Celanese), pentaerythritol tetramontanate (TPET 141 available from Hoechst Celanese), aluminum mono-stearate, aluminum di-stearate, montanic acid wax, montanic acid ester wax, polar polyethylene waxes, and non-polar polyethylene waxes.

The composition of the present invention can also comprise from 0 to 50 wt. % of a reinforcing agent, Component F). Suitable reinforcing agents include any mineral, glass, ceramic, polymeric or carbon reinforcing agent fillers such as glass fibers, micas, talcs, carbon fibers, wollastonite, graphite, silica, magnesium carbonate, alumina, metal fibers, kaolin, silicon carbide, glass flake and the like. Such material may be in the shape of fibers having a length to diameter ratio (LID) of greater than 5. Preferred particle diameters are from 0.1 micrometers to 1 millimeter. Preferred reinforcing agents are glass fibers, glass roving or chopped glass fibers having lengths from 0.1 to 10 millimeters and L/D from 5 to 100. Three such suitable glass fibers are available from Owens Corning Fiberglas under the designation OCF-187A or 497 or from PPG under the designation 3540. Suitable fillers include nonpolymeric materials designed to reduce the coefficient of linear thermal expansion of the resulting material, to provide color or pigment thereto, to reduce the flame propagation properties of the composition, or to otherwise modify the composition's physical properties. Suitable fillers include mica, talc, chalk, titanium dioxide, clay, alumina, silica, glass microspheres, wollastonite, calcium carbonate, magnesium sulfate, barium sulfate, calcium oxysulfate, tin oxide, metal powder, glass powder, and various pigments. Preferred fillers are in the shape of particulates having (L/D) less than 5. The amount of reinforcing agent or filler employed is preferably from 10 to 50 parts by weight. Preferred fillers are talcs with number average diameter less than 1 micron such as MP 10–52 available form Mineral Technologies and wollastonite with number average diameter less than 5 microns such as Jilin™ 2000 available from GLS Minerals, Inc.

The reinforcing agent may include a surface coating of a sizing agent or similar coating which, among other functions, may promote adhesion between the reinforcing agent and the remaining components, especially the matrix, of the composition. Suitable sizing agents may contain amine, aminosilane, epoxy, and aminophosphine functional groups and contain up to 30 nonhydrogen atoms. Preferred are aminosilane coupling agents and $C_{1-4}$ alkoxy substituted derivatives thereof, especially 3-aminopropyltrimethoxysilane.

Polyarylene ethers may also be included in the composition of the present invention as Component G), and are a known class of polymer having been previously described in U.S. Pat. No. 3,306,874, 3,306,875, 3,257,357, and 3,257,358. A preferred polyarylene ether is poly(2,6-dimethyl-1,4-phenylene)ether. The polyphenylene ethers are normally prepared by an oxidative coupling reaction of the corresponding bisphenol compound. Preferred polyarylene ethers are polar group functionalized polyarylene ethers, which are a known class of compounds prepared by contacting polar group containing reactants with polyarylene ethers. The reaction is normally conducted at an elevated temperature, preferably in a melt of the polyarylene ether, under conditions to obtain homogeneous incorporation of the functionalizing reagent. Suitable temperatures are from 150° C. to 300° C.

Suitable polar groups include the acid anhydrides, acid halides, acid amides, sulfones, oxazolines, epoxies, isocyanates, and amino groups. Preferred polar group containing reactants are compounds having up to 20 carbons containing reactive unsaturation, such as ethylenic or aliphatic ring unsaturation, along with the desired polar group functionality. Particularly preferred polar group containing reactants are dicarboxylic acid anhydrides, most preferably maleic anhydride. Typically the amount of polar group functionalizing reagent employed is from 0.01 percent to 20 percent, preferably from 0.5 to 15 percent, most preferably from 1 to 10 percent by weight based on the weight of polyarylene ether. The reaction may be conducted in the presence of a free radical generator such as an organic peroxide or hydroperoxide agent if desired. Preparation of polar group functionalized polyarylene ethers have been previously described in U.S. Pat. No. 3,375,228, 4,771,096 and 4,654,405.

The polar group modified polyarylene ethers beneficially act as compatibilizers to improve adhesion between the reinforcing agent and the syndiotactic monovinylidene aromatic polymer. Thus, their use is particularly desirable when a filler or reinforcing agent is additionally utilized. The amount of polyarylene ether employed in the present resin blend is beneficially from 0.1 to 50 parts by weight, preferably from 0.2 to 10 parts by weight based on 100 parts glass and polyarylene ether.

In one embodiment of the invention the polar group modified polyarylene ether may be in the form of a coating applied to the outer surface of the reinforcing agent to impart added compatibility between the reinforcing agent and the polymer matrix. The polar group modified polyarylene ether so utilized may be in addition to further amounts of polyarylene ether or polar group modified polyarylene ether also incorporated in the blend. The surface coating is suitably applied to the reinforcing agent by contacting the same with a solution or emulsion of the polar group functionalized polyarylene ether. Suitable solvents for dissolving the polar group functionalized polyarylene ether to form a solution or for use in preparing an emulsion of a water-in-oil or oil-in-water type include methylene chloride, trichloromethane, trichloroethylene and trichloroethane. Preferably the concentration of polar group functionalized polyarylene ether in the solution or emulsion is from 0.1 weight percent to 20 weight percent, preferably 0.5 to 5 percent by weight. After coating of the reinforcing agent using either a solution or emulsion, the liquid vehicle is removed by, for example, evaporation, devolatilization or vacuum drying. The resulting surface coating is desirably from 0.001 to 10 weight percent of the uncoated reinforcing agent weight.

Nucleators may also be used in the present invention and are compounds capable of reducing the time required for onset of crystallization of the syndiotactic vinylaromatic polymer upon cooling from the melt. Nucleators provide a greater degree of crystallinity in a molding resin and more consistent distribution of crystallinity under a variety of molding conditions. Higher levels of crystallinity are desired in order to achieve increased chemical resistance and improved heat performance. In addition crystal morphology may be desirably altered. Examples of suitable nucleators for use herein are monolayer of magnesium aluminum hydroxide, calcium carbonate, mica, wollastonite, titanium dioxide, silica, sodium sulfate, lithium chloride, sodium benzoate, aluminum benzoate, talc, and metal salts, especially aluminum salts or sodium salts of organic acids or phosphonic acids. Especially preferred compounds are aluminum and sodium salts of benzoic acid and $C_{1-10}$ alkyl substituted benzoic acid derivatives. A most highly preferred nucleator is aluminum tris(p-tert-butyl)benzoate. The amount of nucleator used should be sufficient to cause nucleation and the onset of crystallization in the syndiotactic vinylaromatic polymer in a reduced time compared to compositions lacking in such nucleator. Preferred amounts are from 0.5 to 5 parts by weight.

Other additives may also be included in the composition of the present invention including additives such as flame retardants, pigments, and antioxidants, including IRGANOX™ 1010, 555, 1425 and 1076, IRGAFOS™ 168, CGL-415, and GALVINOXYL™ available from Ciba Geigy Corporation, SEENOX™ 412S available from Witco, ULTRANOX™ 626 and 815 available from GE Specialty Chemicals, MARK PEP™ 36 available from Adeka Argus, AGERITE™ WHITE, MA and DPPD, METHYL ZIMATE, VANOX™ MTI and 12 available from R. T. Vanderbilt, NAUGARD™ 445 and XL-1 available from Uniroyal Chemical, CYANOX™ STDP and 2777 available from American Cyanamid, RONOTEC™ 201 (Vitamin E available from Roche, MIXXIM CD-12 and CD-16 available from Fairmount, Ethanox™ 398, DHT-4a, SAYTEX™ 8010, 120, BT93 and 102 available from Ethyl, Hostanox™ PAR 24, 03, and ZnCS1 available from Hoechst Celanese, cesium benzoate, sodium hydroxide, SANDOSTAB™ PEPQ available from Sandoz, t-butyl hydroquinone, and SANTOVAR™ A available from Monsanto, phenothiazine, pyridoxine, copper stearate, cobalt stearate, MOLYBDENUM TENCEM™ available from Mooney Chemicals, ruthenium (III) acetylacentonate, boric acid, citric acid, MARK™ 6000 available from Adeka Argus, antimony oxide, 2,6-di-t-butyl-4-methylphenol, stearyl-β-(3,5-di-tert-butyl-4-hydroxyphenol)propionate, and triethylene glycol-bis-3-(3-tert-butyl4-hydroxy-5-methylphenyl)propionate, tris(2,4-tert-butylphenyl)phosphite and 4,4'-butylidenebis (3-methyl-6tert-butylphenyl-di-tridecyl)-phosphite; tris nonyl phenyl phosphite, carbon black, PYROCHEK™ PB68 available from Ferro Corporation, decabromodiphenyl oxide, antiblock agents such as fine particles composed of alumina, silica, aluminosilicate, calcium carbonate, calcium phosphate, silicon resins, and the like; light stabilizers, such as a hindered amine-based compounds or benzotriazole-based compounds; plasticizers such as an organopolysiloxane or mineral oil; blowing agents, extrusion aids, stabilizers such as bis(2,4-di-tertbutylphenyl)pentaerythritol and tris nonyl phenyl phosphite; and the like.

The compositions of the present invention are prepared by combining the respective components under conditions to provide uniform dispersal of the ingredients. For best results, the polymer(s), fillers, and all additives except reinforcing agents are usually melt mixed under harsh mixing conditions to maximize dispersion and distribution of ingredients and then reinforcing agents are added to the melt mixture under gentler mixing conditions to allow dispersion without causing attrition of the reinforcing agent. Alternatively, where a polar group modified polyarylene ether is used, this Component of the blend may be prepared in situ by reacting the polar group reactant with the polyphenylene ether and further incorporating the molten product directly into the finished blend. Mechanical mixing devices such as extruders, internal mixers, continuous mixers, ribbon blenders, solution blending or any other suitable device or technique may be utilized.

The following examples are provided as further illustration and are not to be construed as limiting. Unless stated to the contrary, parts and percentages are based on weight.

EXAMPLES

The following compositions in Tables 1–7 are made using the following procedure:

All ingredients except the glass fibers are dry mixed and melt compounded on a corotating twin screw extruder operating with a nominal 300° C. barrel temperature. The twin screw extruder is configured with two mixing zones, wherein all ingredients but the glass fibers are melted and mixed in the first mixing zone. When included, the glass fibers are introduced into the extruder in the second mixing zone to be mixed with the melt mixture and pellets are prepared. The compounded pellets are injection molded into ASTM Type I tensile bars using a 290° C. barrel temperature. Finally, tensile and flexural properties are measured according to ASTM D638 and ASTM D790, respectively.

The Ethylene-Styrene Interpolymers used in the Examples are listed in TABLE A below.

TABLE A

| ESI INTER-POLYMER | WT. % STYRENE IN INTERPOLYMER | MELT INDEX (g/10 min.) | WT. % ATACTIC POLYSTYRENE |
|---|---|---|---|
| ESI-20 | 20 | .73 | 9 |
| ESI-36 | 36 | .51 | 11.4 |
| ESI-47 | 47 | | 3.7 |
| ESI-65 | 65 | .65 | 14 |
| ESI-70 | 70 | 1.83 | 8.2 |

TABLE 1

UNFILLED DUCTILITY MODIFIED COMPOSITIONS WITH OLEFINIC IMPACT MODIFIER

| Component (wt. %) | I | II* | III* | IV* | V | VI* | VII |
|---|---|---|---|---|---|---|---|
| A)SPS (Mw = 250,000) | 78.8 | 78.8 | 78.8 | 73.85 | 73.85 | 73.85 | 73.85 |
| B)ESI[4]-65 | 10 | | | | | | |
| B)ESI-36 | | 10 | | | | | |
| B)ESI-20 | | | 10 | | | | |
| B)ESI-47 | | | | 5 | | 5 | |
| B)ESI-70 | | | | | 5 | | 5 |
| C)Ethylene/Octene Copolymer[1] | 10 | 10 | 10 | | | | |
| C)Ethylene/Octene Copolymer[2] | | | | 20 | 20 | | |
| C)Ethylene/Octene Copolymer[3] | | | | | | 20 | 20 |
| Irganox ™ 1010[5] | | | | .25 | .25 | .25 | .25 |
| Ultranox ™ 626[6] | | | | .25 | .25 | .25 | .25 |
| p-tBBA/Al[7] | 0.6 | 0.6 | 0.6 | 0.65 | 0.65 | 0.65 | 0.65 |
| G)FAPPO[8] | 0.6 | 0.6 | 0.6 | | | | |
| Tensile Elongation (%) | 20.4 | 2.7 | 2.1 | 6.0 | 25 | 2 | 13 |

[1]Ethylene-octene copolymer elastomer with density of 0.863 and melt index of 0.5 extended with mineral oil (25 weight percent).
[2]Ethylene-octene copolymer having a density of 0.863 and a melt index of 3.
[3]Ethylene-octene copolymer having a density of 0.863 and a melt index of 0.5.
[4]ESI-is ethylene-styrene interpolymer with the number denoting the percentage of the styrene in interpolymer.
[5]Irganox ™ is tetrakis[methylene-3-(3,5-di-tertbutyl-4-hydroxyhydrocinnamate]methane.
[6]Ultranox ™ is bis(2,4-di-t-butylphenyl)pentaerythritol diphospite.
[7]p-tBBA/Al is aluminum salt of p-tertbutyl-benzoic acid.
[8]FAPPO is polyphenylene oxide modified with fumaric acid.
*Comparative examples The elongation of the compositions containing ESI with greater than 40 wt. percent styrene content are clearly superior to the comparative examples.

TABLE 2

GLASS FILLED DUCTILITY MODIFIED COMPOSITIONS

| Component (wt. %) | VIII | IX* | X* |
|---|---|---|---|
| A)SPS (Mw = 250,000) | 43.8 | 52.9 | 57.9 |
| B)ESI[1]-65 | 22.7 | | |
| B)ESI-36 | | 13.6 | |
| B)ESI-20 | | | 8.6 |
| % Ethylene (from ESI above) | 6.12 | 6.12 | 6.12 |
| F)Glass fibers[2] | 30 | 30 | 30 |
| Irganox ™ 1010[3] | .6 | .6 | .6 |
| p-tBBA/Al[4] | .6 | .6 | .6 |
| G)FAPPO[5] | 1.8 | 1.8 | 1.8 |
| Wax OP[6] | .5 | .5 | .5 |
| Tensile elongation (%) | 2.7 | 2.0 | 1.6 |
| Flexural Strain to Break (%) | 3.46 | 2.4 | 2.24 |

[1]ESI-is ethylene-styrene interpolymer with the number denoting the percentage of the styrene in interpolymer.
[2]Glass fibers are treated with aminopropyltrimethoxy silane.
[3]Irganox 1010 ™ is tetrakis[methylene-3-(3,5-di-tertbutyl-4-hydroxyhydrocinnamate]methane.
[4]p-tBBA/Al is aluminum salt of p-tertbutyl-benzoic acid.
[5]FAPPO is polyphenylene oxide modified with fumaric acid.
[6]Wax OP is glycerol Montantate.
*Comparative examples The tensile and elongation of the examples of the present invention is superior to those using ESI interpolymers containing less than 40 wt. percent styrene.

TABLE 3

GLASS FILLED DUCTILITY MODIFIED COMPOSITIONS CONTAINING OLEFINIC IMPACT MODIFIER

| Component (wt. %) | XI | XII* | XIII* |
|---|---|---|---|
| A)SPS (Mw = 250,000) | 57.8 | 57.8 | 57.8 |
| B)ESI[1]-65 | 4.5 | | |
| B)ESI-36 | | 4.5 | |
| B)ESI-20 | | | 4.5 |
| C)Ethylene/Octene Copolymer[2] | 4.5 | 4.5 | 4.5 |
| F)Glass Fibers[3] | 30 | 30 | 30 |
| G)FAPPO[4] | 2 | 2 | 2 |

TABLE 3-continued

GLASS FILLED DUCTILITY MODIFIED COMPOSITIONS
CONTAINING OLEFINIC IMPACT MODIFIER

| Component (wt. %) | XI | XII* | XIII* |
|---|---|---|---|
| Irganox ™ 1010[5] | 0.6 | 0.6 | 0.6 |
| p-tBBA/Al[6] | 0.6 | 0.6 | 0.6 |
| Tensile Elongation (%) | 2.3 | 2.2 | 2.1 |
| Flexural Strain to Break (%) | 2.63 | 2.64 | 2.45 |

[1]ESI-is ethylene-styrene interpolymer with the number denoting the percentage of the styrene in interpolymer.
[2]Ethylene-octene copolymer elastomer with density of 0.863 and melt index ot 0.5 extended with mineral oil (25 weight percent).
[3]Glass fibers are treated with aminopropyltrimethoxy silane.
[4]FAPPO is polyphenylene oxide modified with fumaric acid.
[5]Irganox ™ 5 tetrakis[methylene-3-(3,5-di-tertbutyl-4-hydroxyhydrocinnamate]methane.
[6]p-tBBN/Al is aluminum salt of p-tertbutyl-benzoic acid.
*Comparative examples High tensile elongation and flexural strength properties are maintained in glass filled and olefin impact modified compositions.

TABLE 4

GLASS FILLED DUCTILITY MODIFIED COMPOSITIONS ALSO CONTAINING ESI INTERPOLYMERS CONTAINING 25 TO 40 WT. % STYRENE

| Component (wt. %) | XIV | XV* | XVI* | XVII | XVIII* | XIX* |
|---|---|---|---|---|---|---|
| A)SPS (Mw = 250,000) | 54.6 | 57.2 | 57.5 | 53.9 | 56.5 | 57.4 |
| B)ESI[1]-65 | 1.2 | 0.9 | | 2.5 | 2 | |
| D)ESI-36 | 10.7 | | 0.9 | 10.1 | | 1.8 |
| D)ESI-20 | | 8.4 | 8.1 | | 8 | 7.3 |
| E)Wax OP[2] | 0.5 | 0.5 | 0.5 | 0.5 | 0.5 | 0.5 |
| F)Glass Fibers[3] | 30 | 30 | 30 | 30 | 30 | 30 |
| G)FAPPO[4] | 1.8 | 1.8 | 1.8 | 1.8 | 1.8 | 1.8 |
| Irganox ™ 1010[5] | 0.6 | 0.6 | 0.6 | 0.6 | 0.6 | 0.6 |
| p-tBBA/Al[6] | 0.6 | 0.6 | 0.6 | 0.6 | 0.6 | 0.6 |
| Tensile Elongation (%) | 2.1 | 1.8 | 1.7 | 2.2 | 1.9 | 1.8 |
| Flexural Strain to Break (%) | 2.48 | 2.14 | 2.17 | 2.56 | 2.32 | 2.13 |

[1]ESI-is ethylene-styrene interpolymer with the number denoting the percentage of the styrene in interpolymer.
[2]Wax OP is Glycerol Montantate.
[3]Glass fibers are treated with aminopropyltrimethoxy silane.
[4]FAPPO is polyphenylene oxide modified with fumaric acid.
[5]Irganox ™ is tetrakis[methylene-3-(3,5-di-tertbutyl-4-hydroxyhydrocinnamate]methane.
[6]p-tBBA/Al is aluminum salt of p-tertbutyl-benzoic acid.
*Comparative examples High Tensile elongation and Flexural strength properties are maintained when the composition also contains an interpolymer having a styrene content of from 25–40 weight percent.

TABLE 5

GLASS FILLED DUCTILITY MODIFIED COMPOSITIONS CONTAINING OLEFINIC IMPACT MODIFIER

| Component (wt. %) | XX | XXI* |
|---|---|---|
| A)SPS (Mw = 250,000) | 57.8 | 57.8 |
| B)ESI[1]-65 | 0.9 | |
| B)ESI-36 | | 0.9 |
| C)Ethylene/Octene Copolymer[2] | 6.75 | 6.75 |
| C₂)ESI-20 (domain forming) | 1.35 | 1.35 |
| F)Glass Fibers[3] | 30 | 30 |
| G)FAPPO[4] | 2 | 2 |
| Irganox ™ 1010[5] | 0.6 | 0.6 |
| p-tBBA/Al[6] | 0.6 | 0.6 |
| Tensile Elongation (%) | 2.3 | 1.9 |
| Flexural Strain to Break (%) | 2.48 | 2.41 |

[1]ESI-is ethylene-styrene interpolymer denoting the percentage of the styrene in interpolymer.
[2]Ethylene-octene copolymer elastomer with density of 0.863 and melt index of 0.5 extended with mineral oil (25 weight percent).
[3]Glass fibers are treated with aminopropyltrimethoxy silane.
[4]FAPPO is polyphenylene oxide modified with fumaric acid.
[5]Irganox ™ is tetrakis[methylene-3-(3,5-di-tertbutyl-4-hydroxyhydrocinnamate]methane.
[6]p-tBBA/Al is aluminum salt of p-tertbutyl-benzoic acid.
*Comparative examples Tensile elongation is superior when using ESI having greater than 40 wt. % styrene.

TABLE 6

GLASS FILLED DUCTILITY MODIFIED COMPOSITIONS CONTAINING OLEFINIC IMPACT MODIFIER AND ALSO ESI INTERPOLYMER CONTAINING LESS THAN 40 WT. % STYRENE AND BLOCK STYRENE/OLEFIN IMPACT MODIFIER

| Component (wt. %) | XXII | XXIII* |
|---|---|---|
| A)SPS (Mw = 250,000) | 57.8 | 57.8 |
| B)ESI[1]-65 | 0.9 | |
| B)ESI-36 | | 0.9 |
| C)Ethylene/Octene Copolymer[2] | 6.75 | 6.75 |
| C₂)SEBS[3] (32 wt. % styrene) (Domain forming) | 1.35 | 1.35 |
| F)Glass Fibers[4] | 30 | 30 |
| G)FAPPO[5] | 2 | 2 |
| Irganox ™ 1010[6] | 0.6 | 0.6 |
| p-tBBA/A[7] | 0.6 | 0.6 |
| Tensile Elongation (%) | 2.3 | 1.8 |
| Flexural Strain to Break (%) | 2.54 | 2.73 |

[1]ESI-is ethylene-styrene interpolymer with the number denoting the percentage of the styrene in interpolymer.
[2]Ethylene-octene copolymer elastomer with density of 0.863 and melt index of 0.5 extended with mineral oil (25 weight percent).
[3]SEBS is a styrene/ethylene/butadiene/styrene copolymer.
[4]Glass fibers are treated with aminopropyltrimethoxy silane.
[5]FAPPO is polyphenylene oxide modified with fumaric acid.
[6]Irganox ™ is tetrakis[methylene-3-(3,5-di-tertbutyl-4-hydroxyhydrocinnamate]methane.
[7]p-tBBA/Al is aluminum salt of p-tertbutyl-benzoic acid.
*Comparative examples Properties are improved with the use of ESI having greater than 40 wt. % styrene content.

TABLE 7

GLASS FILLED DUCTILITY MODIFIED COMPOSITIONS CONTAINING OLEFINIC IMPACT MODIFIER AND ALSO ESI INTERPOLYMER CONTAINING LESS THAN 40 WT. % STYRENE AND BLOCK STYRENE/OLEFIN IMPACT MODIFIER AND LUBRICANT

| Component (wt. %) | XXIV | XXV* | XXVII* | XXVII | XXVIII* | XXIX* |
|---|---|---|---|---|---|---|
| A)SPS (Mw = 250,000) | 43.8 | 52.9 | 57.9 | 54.6 | 57.2 | 57.5 |
| B)ESI[1]-65 | | | | 1.2 | 0.9 | |
| B)ESI-36 | | | | | | 0.9 |
| B)Oil Extended | 22.7 | | | | | |

TABLE 7-continued

GLASS FILLED DUCTILITY MODIFIED COMPOSITIONS CONTAINING OLEFINIC IMPACT MODIFIER AND ALSO ESI INTERPOLYMER CONTAINING LESS THAN 40 WT. % STYRENE AND BLOCK STYRENE/OLEFIN IMPACT MODIFIER AND LUBRICANT

| Component (wt. %) | XXIV | XXV* | XXVII* | XXVII | XXVIII* | XXIX* |
|---|---|---|---|---|---|---|
| ESI-65** B/D)Oil Extended |  | 13.6 |  | 10.7 |  |  |
| ESI-36** B/D)Oil Extended |  |  | 8.6 |  | 8.4 | 8.1 |
| ESI-20** |  |  |  |  |  |  |
| E)Wax OP$^2$ | 0.5 | 0.5 | 0.5 | 0.5 | 0.5 | 0.5 |
| F)Glass Fibers$^3$ | 30 | 30 | 30 | 30 | 30 | 30 |
| G)FAPPO$^4$ | 1.8 | 1.8 | 1.8 | 1.8 | 1.8 | 1.8 |
| Irganox ™ 1010$^5$ | 0.6 | 0.6 | 0.6 | 0.6 | 0.6 | 0.6 |
| p-tBBA/Al$^6$ | 0.6 | 0.6 | 0.6 | 0.6 | 0.6 | 0.6 |
| Tensile Elongation (%) | 2.5 | 2.1 | 2.1 | 2.3 | 2.2 | 2.1 |
| Flexural Strain to Break (%) | 2.99 | 2.4 | 2.48 | 2.63 | 2.51 | 2.5 |
| 264 psi DTUL without oil (° C.) | 118 | 160 | 188 | 159 | 160 | 171 |
| 264 psi DTUL with oil (° C.) | 131 | 179 | 213 | 169 | 159 | 174 |

$^1$ESI-is ethylene-styrene interpolymer with the number denoting the percentage of the styrene in interpolymer.
$^2$Wax OP is glycerol montantate.
$^3$Glass fibers are treated with aminopropyltrimethoxy silane.
$^4$FAPPO polyphenylene oxide modified with fumaric acid.
$^5$Irganox ™ 1010 is tetrakis[methylene-3-(3,5-di-tertbutyl-4-hydroxyhydrocinnamate]methane.
$^6$p-tBBA/Al is the aluminum salt of p-tertbutyl-benzoic acid.
*Comparative examples
**The polymer is extended with 25 weight percent mineral oil.
DTUL is the deflection temperature under load.

What is claimed is:

1. A composition consisting essentially of:
    A) a syndiotactic monovinylidene aromatic polymer,
    B) a random interpolymer of an aliphatic alpha-olefin and a vinyl aromatic monomer, wherein the interpolymer contains greater than 40 wt % vinyl aromatic monomer,
    C) optionally, an elastomeric olefinic impact modifier,
    D) optionally, an random interpolymer of an aliphatic alpha-olefin and a vinyl aromatic monomer, wherein the interpolymer contains from 25 to 40 wt. % vinyl aromatic monomer,
    E) optionally, a lubricant,
    F) a reinforcing agent, and
    G) optionally, a polyphenylene ether.

2. The composition of claim 1 wherein the syndiotactic monovinylidene aromatic polymer is syndiotactic polystyrene.

3. The composition of claim 1 wherein the random interpolymer is an ethylene-styrene interpolymer.

4. The composition of claim 3 wherein the ethylene-styrene random interpolymer contains at least 50 weight percent styrene.

5. The composition of claim 1, wherein an elastomeric olefinic impact modifier is present.

6. The composition of claim 5 wherein the elastomeric olefinic impact modifier is a ethylene/octene copolymer.

7. The composition of claim 6 wherein the elastomeric olefinic impact modifier is present in an amount of from 1 to 35 weight percent based on the total weight of the composition.

8. The composition of claim 5, wherein a domain forming rubbery polymer is present.

9. The composition of claim 8 wherein the domain forming rubbery polymer is a hydrogenated styrene/ethylene/butadiene/styrene block copolymer.

10. The composition of claim 9 wherein the domain forming rubbery polymer is present in an amount of 2 to 30 weight percent based on the wt. of the olefinic impact modifier.

11. The composition of claim 1, wherein a random interpolymer of an aliphatic alpha-olefin and a vinyl aromatic monomer is present, wherein the interpolymer contains from 25 to 40 wt. percent vinyl aromatic monomer.

12. The composition of claim 11 wherein the random interpolymer is an ethylene-styrene interpolymer.

13. The composition of claim 1, wherein a lubricant is present.

14. The composition of claim 1 which further comprises a reinforcing agent.

15. The composition of claim 14 wherein the reinforcing agent is glass fiber.

16. The composition of claim 15, wherein a polyphenylene ether is present.

17. The composition of claim 16 wherein the polyphenylene ether is a polyphenylene ether modified with fumaric acid.

18. A composition consisting essentially of:
    A) a syndiotactic monovinylidene aromatic polymer,
    B) an random interpolymer of an aliphatic alpha-olefin and a vinyl aromatic monomer, wherein the interpolymer contains greater than 40 wt. % vinyl aromatic monomer,
    C) an olefinic impact modifier,
    D) an random interpolymer of an aliphatic alpha-olefin and a vinyl aromatic monomer, wherein the interpolymer contains from 25 to 40 wt. % vinyl aromatic monomer,
    E) a lubricant,
    F) a reinforcing agent, and
    G) a polyphenylene ether.

* * * * *